United States Patent Office 3,594,186
Patented July 20, 1971

3,594,186
PRODUCING A FULL-FAT FLOUR PRODUCT
FROM COTYLEDON SEED MATERIALS
Robert L. Hawley, Webster Groves, Mo., and Jesse T. Duren, Belleville, Ill., assignors to Ralston Purina Company, St. Louis, Mo.
No Drawing. Continuation-in-part of abandoned application Ser. No. 637,910, May 12, 1967. This application Apr. 26, 1968, Ser. No. 724,326
Int. Cl. A23l 1/20
U.S. Cl. 99—99
15 Claims

ABSTRACT OF THE DISCLOSURE

A method of making full-fat flour products from hull enclosed cotyledons, especially pea or bean legumes, particularly soybeans, utilizing a novel sequence of steps to dehull and also to alter the texture and cell structure in a manner causing the treatment steps to remove objectionable flavor constituents, to remove or alter physiologically objectionable sugar constituents, and basically to produce a full-fat edible flour product retaining the desirable oils, by the use of a special combination of controlled dry heating of the complete bean externally and internally, to alter the internal and external chemical and physical characteristics thereof, followed by controlled water treatment to further alter the heat altered structure by swelling and extraction processes. This is followed by either (a) drying the treated cotyledons and grinding to a powder, or (b) grinding the treated cotyledons, slurrying with water, and flash drying to a powder.

This application is a continuation-in-part of our co-pending application Ser. No. 637,910, filed May 12, 1967 now abandoned.

BACKGROUND OF THE INVENTION

This invention relates to the treatment of hull enclosed cotyledons, especially bean or pea legumes, particularly those having characteristics preventing or inhibiting use thereof as food, a prime example of which is soybeans, and more particularly relates to a method of chemically and physically modifying such to provide an acceptable food of oil containing flour, basically ful-fat soy flour.

The present development was made largely in connection with soybeans, because of the potential nutritional value of such, the widespread availability of this legume, and the necessity for a unique method of treating such because of the significant physical and chemical problems preventing commercial practical conversion of raw soybeans into a highly desirable, full-fat flour. Hence, the invention will be explained largely with respect to soybeans. In fact, it has proven to be an extremely effective process for treating soybeans. However, the process, in the broader concept of this invention, has also been found to be effective for converting other legumes, specifically beans and peas into modified food products.

The term "complete seeds" or "complete beans" when used herein shall mean beans or peas with the hulls in place enclosing the cotyledons.

The term "full-fat" when used herein refers to the characteristics of retaining desirable natural oils in the food flour produced.

Soybeans as naturally found, either as a wild bean or a cultivated bean, are not a desirable food for humans because of their flavor, density and the presence of trypsin inhibitors, hemaglutinin and stachyose. Utilization of these beans is somewhat limited because of their natural characteristics. If a normal dried soybean with hull intact is placed in warm or cold water it will hydrate, i.e. absorb water to its fullest capacity within 8 to 24 hours. The water passes through the hypocotyl, and then to the cotyledons. If the hull of a normal dried soybean is damaged, (i.e., cracked or torn) and this bean is placed in water, it will hydrate more rapidly because the water can by-pass this special flow path. However, the cotyledons will absorb moisture non-uniformly and will disintegrate. This disintegration exposes and ruptures internal cell walls, thus allowing protein, fats (i.e. oils) and sugars to be leached into the soak water. The loss of the cell contents repersents a monetary loss to a soybean processor for they will be discarded with the soak water. In addition, when the soak water is so contaminated with proteins, oils and sugars, the bacterial growth during the soaking period of 8 to 24 hours is phenomenal.

It is impossible in normal consumer practice to obtain soybeans in which there are no cracked (torn) hulls or broken beans. Yet, it is desirable to soak soybeans in water and then use the soaked soybean in the development of further processed human food items. Because of these natural characteristics of soybeans, i.e., beany flavor, density, presence of trypsin inhibitors, hemoglutinin and stachyose nad the soaking characteristics, the food industry has not found the soybean to be very attractive for use in further processed human foods. Indeed the orientals ferment whole beans in order to render them edible.

One significant problem in treating soybeans is that the soybean hull adheres too tightly to the cotyledons to be readily removed. Nor can the hearts (hypocotyls) to be readily removed. Even when the hulls are removed according to present techniques, the cotyledons cannot be ground into an acceptable soy flour due to the undesirable constituents contained, as noted previously. We have found that if normal field dried soybeans are treated in a certain manner, the hydration characteristics of the bean are dramatically and totally changed from the norm, that the hydrated cotyledons can then be altrenated profitably to effect an acceptable product, that the hull can be totally and easily separated from the bean, that the hearts (hypocotyls) can be readily removed and separated from the cotyledons, and that the altered cotyledons can be processed into an acceptable, bland, full-fat flour.

Soybeans thus present several particular characteristics presently preventing economical commercial conversion into edible full-fat flour. In brief, firstly, dependable high production dehulling is extremely difficult to achieve; secondly, soybeans contain objectionable bitter flavor characteristics; thirdly, soybeans contain physiologically objectionable substances such as tri-saccharides and tetra-saccharides; and fourthly, soybeans, even after dehulling, are so extremely dense that removal of these undesirable constituents is practically impossible without removing all of the beneficial ingredients such as the oils and proteins, and thereby destroying the utility of the product as a food. Further, these characteristics are inter-related to the extent that efforts to overcome one frequently adversely affects efforts to overcome another. Also, as noted, efforts to overcome one or more of these characteristics frequently adversely affects efforts to retain desirable nutritional components such as the proteins or the oils, or causes disintegration of the bean. These factors are illustrative of the many complications involved which have largely prevented any significant commercial conversion and sale of soybeans or like legumes in the form of full-fat flour, in spite of the common knowledge of the high potential nutritional value of the bean.

Consequently, although many proposals and even patented methods have been devised for making such food products from soybeans and although the market is ripe for such products, each proposed method, as far as is known, has significant drawbacks preventing commercial exploitation, as is attested to by the absence of such food flour products in the market. Other legumes or hull enclosed cotyledons frequently present difficulties also.

A great amount of the difficulty lies in the fact that even the simplest treatment steps have largely unpredictable chemical and physical results in the item, particularly soybeans.

SUMMARY OF THE INVENTION

It is a primary object of this invention to provide a specific special sequence of treatment steps that enable soybeans and like legumes to be commercially converted from the raw complete bean to a full fat delectable flour retaining the nutritional protein and oil components, with the objectionable flavor and physiologically objectionable components removed, and having a pleasing and edible texture. Moreover, the process is subject to high production output of product, causing dependable conversion of the beans to hull free, highly desirable flour.

The novel process employs controlled dry heating of the complete bean clear through to obtain a specific hull cracking characteristic, and controlled chemical changes in the body of the bean to cause rapid and uniform hydration in water, to allow effective subsequent leaching out of certain bitter flavor constituents and physiologically objectionable sugars in water, and to alter the nature of the oils and proteins to prevent subsequent leaching out of these desirable oils and proteins with leaching out of the undesirable constituents. The heat treatment also itself causes some flavor improvement. This is preferably followed directly by controlled water treatment to cause dehulling and removal of the hypocotyls, regulated cotyledon swelling and expansion which enables osmotic leaching out of objectionable substances, without disintegration of the cotyledon or loss of proteins or desired oils. The altered cotyledons are then converted to flour by either drying and grinding or by grinding, slurrying, and flash drying.

Several other objects of this invention will become apparent to those in the art upon studying this disclosure.

DESCRIPTION OF THE PREFERRED EMBODIMENTS

The inventors herein have found particular treatment steps that will produce the long sought, full-fat soy flour from soybeans, enabling rapid, relatively simple, dependable dehulling without causing the bean to disintegrate, causing rapid hydration and swelling, enabling removal of objectionable flavor characteristics, and allowing removal of physiologically objectionable substances, yet without loss of the nutritionally valuable proteins and oils. In fact, the sending of pilot plant experimental samples of the product of this invention to potential food industry purchasers for testing and evaluation has quickly resulted in requests by them for large quantities of the product.

One important facet of the process is the treatment of the beans in a manner allowing subsequent water treatment without disintegration of the beans and with leaching out of undesirable constituents but not of desirable constituents. According to the process herein, heating the complete seeds, i.e. with the hulls enclosing the cotyledons, is done by using dry heat. It is realized that patents have issued in recent years that teach of using dry heat to dehull soybeans to prepare the beans for extraction of the oil and use of the remaining meal for animal feed or the like. In practicing these prior processes, it is taught to be important that only the hull be heated, to avoid adverse effects on the subsequently extracted oil and to cause proper hull removal, and then the hulls must be cooled to allow them to be properly broken off and the oil extracted. The problems are significantly different when the beans are to be used as fat or oil containing flour for human food and not for oil extraction.

In the present process, where fat containing food products are to be prepared, and where the product texture must be acceptable to humans, it has been found by the inventors that the bean must be heated to an elevated temperature both internally and externally, i.e. heated clear through to an extent to essentially modify the internal seed structure, including the proteins and oils. Careful analysis and experimentation have shown that this causes several changes to occur, physically and chemically, in preparation for the water treatment. These changes are advantageous for dehulling, and preparation of the item as a food.

The dry heating can be conducted with heated air, or with heated gases such as combustion gases. Preferably, the beans are dry heated directly in a combustion flame, i.e. in heated combustion gases during actual combustion. This not only splits the hull, but also partially consumes the hulls.

Experimentation with the dry heating step indicates that the chief criterion to obtain the necessary results is heat input rather than specific time or temperature. The temperature of the ambient hot gases, e.g. hot air or flame combustion gases, may vary from about 175° F. to about 500° F., with the time required being greater for the lower than the higher temperatures. The time for the low temperature is up to about 60 minutes or so while that for the high temperatures is about 10 seconds or so. The preferred temperature range is about 250°–450° F., with the respective time range being about 10 minutes to about 25 seconds. Although the heat input is believed the controlling criterion, the exact B.t.u. input is extremely difficult to exactly determine for each bean. Also, although the temperature of the center of the bean is extremely difficult to accurately determine, as closely as can be determined it is believed that a mean interior bean temperature of about 160° F. to 250° F. should be achieved and maintained for a few seconds to several minutes to obtain the necessary heat input for causing the important internal as well as external changes in the complete bean.

One effect of this controlled dry heating of the complete bean is to cause the hull to split perpendicular to the long axis of the cotyledons. In the subsequent water treatment, this allows easy hull removal and also rapid moisture entry and hydration of the cotyledons in minutes, i.e. about 15–20 minutes, rather than requiring many hours when hydrating the cotyledons naturally through the hypocotyl. Yet this rapid hydration will occur without disintegration of the cotyledons or significant loss of proteins or desired oils, because the heat treatment causes internal molecular changes in the bean which prevent this. A full technical explanation of these changes is not known. The proteins are believed to be rendered insoluble by being denatured, and the oils are altered in some way that prevents their being significantly leached out in water, even though the cell structure is substantially expanded in water to allow leaching out of undesirable constituents as fully explained hereinafter. The hull splitting also causes hull removal to be simple and complete in the subsequent water treating step. Further, this thorough heat treating step also causes some improvement in flavor.

After the complete beans are heated thusly, they are immersed in water, preferably while the beans are still hot. By gently agitating the water and beans, the hulls are readily released from and fall off the cotyledons. By slightly more vigorous agitation or rubbing, the hypocotlys are also released from the cotyledons, to allow their removal with the hulls. This is desirable because the hypocotyls are a source of bitter unsaturated oils, and because of their removal extends the shelf life of the product considerably. Also, the cotyledons rapidly and uniformly absorb moisture, without disintegrating, causing swelling and expansion of the high density cotyledons to a size 2–3 times the original, with a density of only ⅓–½ of the original. This swelling and expansion causes the cell structure to expand and open. This is very significant in facilitating osmotic extraction or leaching out of constituents causing bitter flavor and objectionable tri- and tetra-saccharides such as tri-saccharide mannitose and stachyose which would othewise produce flatus in the consumer.

The water treatment may vary slightly depending upon the amount of natural sugars desired in the final product. If it is desirable to remove much of the tri- and tetra-saccharides because of flatus production, but to retain some of the unobjectionable mono- and di-saccharides, the water treatment may constitute a water soak without boiling the water to cause cooking. This soak allows dehulling, cotyledon swelling, and significant removal of bitter flavor causing constituents, but only some of the sugars. If one desires ot remove substantially all of the objectionable higher saccharide sugars, as is preferred, the water treatment may comprise a water soak followed by cooking in water, or, in actual practice, a simultaneous water soaking and cooking by placing the heat treated beans directly in hot or boiling water. This cooking is advantageous in more effectively removing bitter flavor causing constituents as well as objectionable sugars. This sugar leaching is very effective if the water is boiled for about ¼ to 1 hour. Boiling also bleaches the cotyledons to a more attractive light shade. Actually, the time of soaking may vary from about 15 minutes to about 60 minutes or so, with 15–20 minutes being normally sufficient. The cooking time may also be 15–60 minutes. In actual practice, these times may be concurrent. Although the soaking and/or cooking time may be greater than about 60 minutes, this is not normally necessary. This is in sharp contrast to the basically ineffective leaching experiments which have required many hours in the past, and which resulted in destruction of the food utility of the product due to simultaneous leaching out of valuable proteins and oils.

During this water treatment, most effective sugar leaching is obtained with either multiple change of the water on a batch basis, or with continuous exchange of the water on a continuous processing basis, to keep the sugar concentration in the water relatively low. If this sugar concentration in the water is not kept low, the osmotic leaching action of the sugars is lessened considerably. Yet, if the previous heat treatment is properly carried out, in the valuable proteins and desirable oils remain intact in the cotyledons and do not leach out as normally occurs when soaking hulled soybeans in water.

The separated cotyledons, when removed from the water bath, are intact, in whole form, with smooth surfaces and an appealing nature, have an excellent open texture, possess the desirable nutritional constituents, and are generally free of the undesirable internal constituents and external components.

According to the novel method set forth herein, these moist cotyledons can then be converted to full-fat soy flour by one of two alternatives, both using grinding and drying steps.

According to the first alternative, the drying is done prior to the grinding. The moist cotyledons are dried from the high moisture which is usually about 60%–70% by weight to a relatively low moisture content generally in the range of about ½%–10% by weight. This final moisture content is not critical but should be below about 10% to avoid spoilage during storage before ultimate use. It preferably is about 4%–6% by weight. This drying is normally done at an elevated temperature below roasting temperatures, i.e. above about 90° F. but below about 250° F., with heated air. It may be done by just solar drying however, at ambient temperatures, although this is somewhat impractical in production. The preferred drying is conducted with flowing gases, usually air, at temperatures between about 120° F. to about 250° F. The quicker the drying is achieved, the less the expanded cotyledons shrink toward their initial size. The dried cotyledons are then ground to a flour type powder. Any grinder suitable for dry product may be used, e.g. a Fitzpatrick comminution mill. This powder has an excellent bland flavor, particularly if the heat treated cotyledons were cooked, and a whitish shade.

According to the second alternative, the grinding is done prior to the drying. The moist expanded cotyledons are directly ground to a moist particular mass, and then dried. Preferably, the mass is slurried with water to a solids content suitable for flash drying, such as spray drying, i.e. usually about 3%–20% solids by weight, and then flash dried to a fine flour product having a stable low moisture content of less than about 5% by weight, and usually in the range of ½%–5%. This flour is also of an excellent bland flavor, and a whitish shade. It will be realized that with this second alternative, the water may be added to the cotyledons prior to or during grinding, as well as grinding, depending upon the type of grinding equipment and technique employed. Typical grindings usable include a comminution will, an attrition mill, or a fixed blade hammer mill.

A few illustrative examples of the process are as follows:

EXAMPLE NO. 1

Soybeans are heated with hot air at a temperature of 450° F. for 2½ minutes, causing internal changes and causing the hulls to split perpendicular to the main axis of the cotyledons. The beans, while still hot, are put into a water bath previously heated to near boiling. The water is boiled for 45 minutes and agitated, causing the hulls to fall off the beans and the hypocotyls to be released from the cotyledons, causing the cotyledons to swell and expand, and causing osmotic leaching of the undesirable constituents. The cotyledons are then removed from the water, dried with moving air of 175° F. temperature to a moisture content of 3% by weight, and ground to a flour like consistency.

EXAMPLE NO. 2

Soybeans are treated as in Example No. 1, except that the water is continuously exchanged with fresh boiling water, and the removed cotyledons are ground to a particulate mass, mixed with water to form a slurry of 15% by weight solids content, and spray dried to a fine flour having a moisture content of 1% by weight.

EXAMPLE NO. 3

Soybeans are heated within a combustion flame at a temperature of 500° F. for 2 minutes. The heated beans are placed directly into water at a temperature of 160° F., and allowed to soak for 55 minutes, while being agitated. The separated cotyledons are removed from the treatment water, ground while adding water, to form a water slurry with solids content of 10% by weight, and flash dried to a moisture content of ½% by weight.

EXAMPLE NO. 4

Garbanzo peas (Chick peas) are heated with hot air at a temperature of 275° F. for 8 minutes. The peas are then placed in water and cooked for 30 minutes. They are then removed from the cook water, dried with moving air at a temperature of 140° F. to a moisture content of 4% by weight, and ground to a flour consistency.

EXAMPLE NO. 5

The procedure of Example No. 1 is substantially repeated except that the soybeans are heated with hot air at a temperature of 425° F. for a period of about 36 seconds instead of at 450° F. at 2½ minutes. The resulting full-fat soy flour has substantially the same properties as that produced by the procedures of Example No. 1.

Many other examples could be set forth, but since the noted examples and the teachings herein are sufficient for one having ordinary skill in the art to practice the invention, additional examples would only be superfluous.

It is conceivable that the conceptual method herein can be practiced in various ways within the criteria set forth. Hence, the invention is intended to be limited only to the definitions provided in the attached claims and the reasonable equivalents thereto.

We claim:
1. A method of producing a full-fat flour product from cotyledon seed materials comprising the steps of: heating the complete seeds clear through with dry heat using ambient gaseous temperatures of about 175°–500° F., for a period of about 10 seconds to about 60 minutes to obtain sufficient heat input to the exterior and interior of the seeds to cause their hulls to split, to render the proteins insoluble, to render the oils substantially stable against osmotic extraction in water, and to stabilize the cotyledons against disintegration in water; then treating the seeds with water for at least about 15 minutes to separate the cotyledons from the hulls thereof, to cause the cotyledons to controllably and uniformly swell and expand, to extract from the swollen, expanded cotyledons certain objectionable flavor constituents, and to controllably extract undesirable sugar constituents; removing the cotyledons from the treatment water; and comminuting and drying the cotyledons to a bland flavored flour.

2. The method in claim 1 wherein the drying is done prior to the comminuting of the cotyledons.

3. The method in claim 2 wherein the comminuted product is slurried with water and flash dried.

4. The method in claim 1 wherein the water treatment step is carried out in water at the boiling temperature.

5. The method in claim 1 wherein the cotyledons are separated from both the hypocotyl and the hulls during the water bath treatment.

6. The method in claim 1 wherein said water treatment is effected with water having a sufficiently low concentration of leached sugars to permit the osmotic leaching action of the sugars from the cotyledons by replacing the water containing extracted constituents with fresh water substantially throughout the water treatment step.

7. The method in claim 1 wherein the seeds are one of beans and peas.

8. The method in claim 1 wherein said heat treatment is conducted directly in combustion flames.

9. A method of treating soybeans comprising the steps of: heating the complete beans clear through with dry heat using ambient gases of about 175°–500° F. for a period of about 10 seconds to about 60 minutes to obtain sufficient heat input to the exterior and the interior of the beans to cause their hulls to split, to render the proteins insoluble, to render the oils substantially stable against osmotic extraction in water, and to stabilize the cotyledons against disintegration in water; treating the heat treated soybeans in water for at least about 15 minutes to separate the cotyledons from the hulls thereof, to cause the cotyledons to controllably and uniformly swell and expand, to extract from the expanded cotyledons certain objectionable flavor causing constituents, and to controllably extract undesirable sugar constituents, removing the cotyledons from the treatment water, and comminuting and drying the cotyledons to a bland flavored flour.

10. The method in claim 9 wherein the drying is done prior to the comminuting of the cotyledons.

11. The method in claim 9 wherein the water treatment step is carried out in water at the boiling temperature.

12. The method in claim 9 wherein said water treatment is effected with water having a sufficiently low concentration of leached sugars to permit the osmotic leaching action of the sugars from the cotyledons by replacing the water containing extracted constituents with fresh water substantially throughout the water treatment step.

13. The method in claim 9 wherein the cotyledons are separated from both the hypocotyl and the hulls during the water bath treatment.

14. The method in claim 9 wherein said heat treating is conducted in combustion gas flames.

15. A ground soybean product which comprises ground dehulled cotyledons having the protein and oil thereof stable against osmotic extraction in water and having certain objectionable flavor constituents and undesirable sugar constituents extracted therefrom as prepared by the process of claim 9.

References Cited

UNITED STATES PATENTS

| | | | |
|---|---|---|---|
| 2,135,591 | 11/1939 | Moulton | 99—99 |
| 3,220,451 | 11/1965 | Ballens et al. | 146—227 |

FOREIGN PATENTS

| | | | |
|---|---|---|---|
| 554,438 | 12/1941 | Great Britain | 99—99 |

A. LOUIS MONACELL, Primary Examiner

W. A. SIMONS, Assistant Examiner

UNITED STATES PATENT OFFICE
CERTIFICATE OF CORRECTION

Patent No. 3,594,186          Dated July 20, 1971

Inventor(s) Robert L. Hawley et al.

It is certified that error appears in the above-identified patent and that said Letters Patent are hereby corrected as shown below:

Column 2, line 23, "nad" should read -- and --; line 29, after "(hypocotyls)" cancel "to"; line 37, "altrenated" should read -- alternated --. Column 5, line 12, "ot" should read -- to --. Column 6, line 12, after "as", second occurrence, insert -- after --; line 14, "grindings" should read -- grinders --; line 61, "re" should read -- re- --.

Signed and sealed this 30th day of May 1972.

(SEAL)
Attest:

EDWARD M. FLETCHER, JR.
Attesting Officer

ROBERT GOTTSCHALK
Commissioner of Patents